United States Patent Office 2,941,026
Patented June 14, 1960

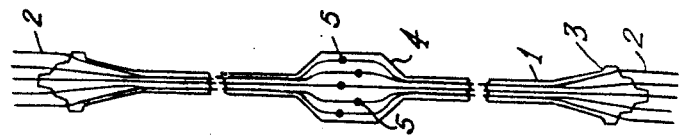
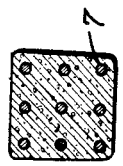
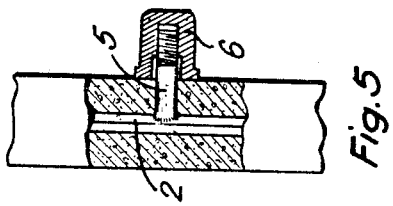
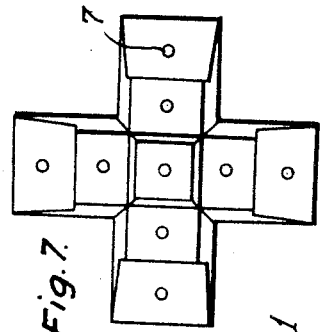
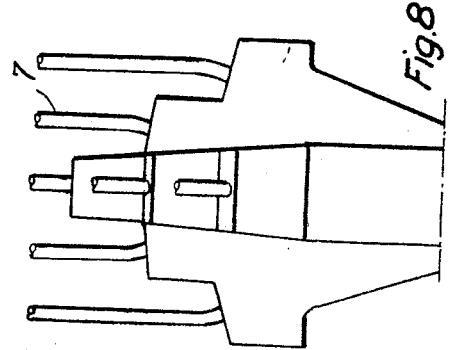
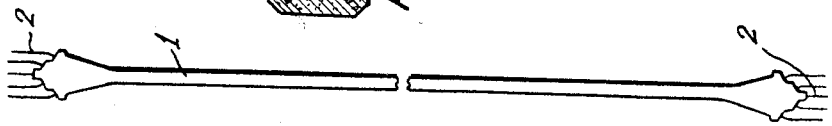
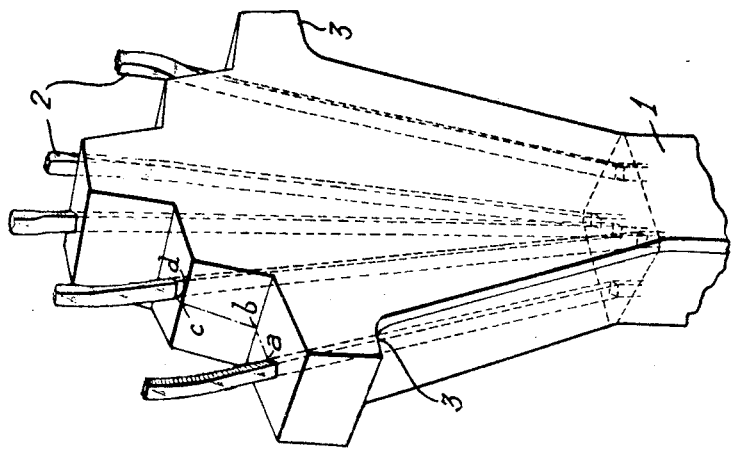

2,941,026

PREFABRICATED ELECTRIC LINE ELEMENTS, COMPRISING CONDUCTORS EMBEDDED IN AN INSULATING MATERIAL

Emile Pierre Claudius Lambert, 129 Boulevard Diderot, Paris, France

Filed Mar. 20, 1957, Ser. No. 647,371

Claims priority, application France Mar. 22, 1956

11 Claims. (Cl. 174—71)

The present invention relates to electric line elements made by embedding bare conductors (of aluminum or copper for example) in an insulating material, more particularly in an insulating concrete, said conductors acting as a reinforcement for the embedding material.

It has already been proposed of placing such elements end to end to constitute, for example, electric vertical mains in buildings. In modern buildings, shafts are provided for accommodating such mains. In old buildings, staircases may be used therefor.

Known mains of this type have a uniform cross-section area, which has to be rather large because of the necessary spacing between the conductors at their junctions, so that the elements are relatively heavy.

The main object of the present invention is to substantially reduce the weight of electric elements of the type specified above, and thus accordingly reduce their cost-price and transportation expenses, while facilitating handling and installation.

To this end, the present invention provides an electric line element of the type specified above, wherein the conductors are grouped and arranged in the major portion of the length of the element so that the cross-sectional area of the element be as small as possible or desired, the cross-section being enlarged at both ends of the element to permit of spreading out the conductors in a fan-like manner so that they emerge from the insulating material at the spacing required for the electric connections and junctions.

It will be appreciated that a substantial weight of the insulating material may thus be spared.

According to the invention, the shape and area of the cross-section are preferably so chosen in view of the both number and cross-section of the conductors (which may be square, round or of other shape) and the latter so arranged in said cross-section that the properties of the insulating material are the most efficiently used.

The elements may have any suitable length, and for vertical mains in buildings, their length will preferably correspond to the height of a story. However, owing to their reduced weight the elements of the invention may be made longer. With such longer elements, it may be necessary to provide for intermediate tappings. Then, at the tapping points, the element will be widened, to permit of spreading out the conductors to connect thereto suitably spaced branch terminals. The number of element junctions may thus be reduced without increasing the distance between tappings. The length of the element is then limited only by the manufacture and handling conditions.

The elements of the invention may be used in the vertical, in the horizontal, or in an oblique direction, and they may be bent at intermediate point preferably at the aforementioned widened tapping points, if any.

According to another feature of the invention, the ends of the elements are stepped, one conductor emerging on each step. The length of the current leakage path between the points where two adjacent conductors emerge from the insulating material is thus increased.

In order to avoid dust deposits around the conductors on said steps when the elements are standing vertically, the top surface of said steps are conveniently inclined outwardly. Moreover, the projecting ends of the conductors are conveniently left diverging from the axis of the element, for instance at right angles to the above mentioned step surfaces, so that the user, for making the conductors parallel to the element axis, may bend them at the distances required from their emerging points to obtain the desired spacing between each other in accordance with the requirements of the junction or connection device to be used.

The conductors may spread out at the ends of the element either in a single plane, or in more than one plane, for example two planes at right angles, according to requirements.

These and other features of the invention will appear more clearly in the following description, with reference to the annexed drawings, of some preferred embodiments of this invention.

In the drawings:

Fig. 1 is an elevational view, partly broken away, of a five-conductor electric line element according to an embodiment of the invention.

Fig. 2 is a cross-section on a larger scale of the main body of the same element, showing the position of the conductors in the smaller cross-section.

Fig. 3 is a perspective view on a larger scale of an end portion of the same element, showing the spreading out of the five conductors.

Fig. 4 is a diagrammatical view, partly broken away, of a five-conductor element similar to that of Figs. 1 to 3, but formed with an intermediate tapping connection.

Fig. 5 is a detailed side view on a larger scale, with partial section, showing a possible arrangement of an intermediate tapping terminal.

Fig. 6 is a cross-section of the main body of a nine-conductor element according to another embodiment of the invention, and Figs. 7 and 8 are respectively a plan view and an elevational view of an end portion of said nine-conductor element.

The element of vertical mains illustrated in Figs. 1 to 3 comprises five bare conductors 2, of aluminum or copper for example, embedded in a suitable insulating concrete. The cross-section of the main body of the element is generally square, one conductor 2 being positioned at the center and one conductor 2 in each corner. In the illustrated example, the cross-section of the conductors is square, and the sides thereof are parallel to the diagonals of the concrete cross-section. This arrangement is the most compact possible of five conductors to obtain the smallest concrete cross-section together with the most efficient use of the dielectric properties of the concrete material.

Near each end, the element 1 spreads out in a fan-like manner to increase its width, its thickness in the other direction remaining unchanged (or even being tapered if desired) so as to obtain at the end a width sufficient for the conductors 2 emerging at the required spacing from each other. As shown in Fig. 3, the central conductor 2 extends straight on to the emerging point, whereas the other conductors 2 are bent outwardly from the corners, two towards the left, and two towards the right.

The ends of the element are formed with steps rising from both sides towards the axis of the element, one for each conductor, i.e. five steps in the illustrated example. One conductor emerges on each step, as shown, and the top surfaces of the steps are preferably so inclined that the conductors emerge substantially at right angles with said surfaces. Owing to said steps, the length of the possible current leakage path, such as abcd (Fig. 3) is considerably increased, substantially doubled for instance if the height of the steps is about equal to their width.

Under the two lower steps are formed horizontal shoulders 3 to facilitate the fixation of the element in the standing position to a building structure.

In known electric lines of this type, the elements 1 have the same width as at their ends throughout their length. It will be appreciated therefore that a considerable volume and weight are spared in the elements of the invention with respect to said known elements, as it appears clearly from a single glance at Fig. 1.

Fig. 4 shows a widened portion 4 formed at a point of an element 1 for an intermediate tapping. The five conductors 2 are spread out to be placed side by side in said widened portion. On each conductor is welded a terminal 5 (Fig. 5) projecting outside for the connection of the branch conductors. The adjacent terminals 5 are staggered in the longitudinal direction of the element so as to increase their spacing without too much widening the element. The terminals 5 may be threaded as shown and receive an insulating protecting cap 6.

In the example illustrated in Figs. 6 to 8, the element comprises nine conductors 7 of round cross-section. The ends of the element spread out crosswise in two perpendicular directions, so that the emerging conductors are arranged in two crossing lines, two of the conductors in the corners extending to each end of each line. In each line, steps are arranged as in Fig. 3, and the conductors 7 emerge from the insulating concrete body substantially at right angles to the top surface of the steps, as best shown in Fig. 8.

Of course, without departing from the present invention as defined in the appended claims, modifications may be made in the features of the embodiments described hereinabove and illustrated in the drawings. It will be appreciated that the number, the cross-section and the arrangement of the conductors may vary and the cross-section of the element will be easily adapted thereto. The invention may obviously be used, not only for vertical mains in buildings, but in every case where prefabricated elements of the type described may be convenient or economical, for example for horizontal mains in industrial buildings.

What I claim is:

1. A prefabricated electric line element usable for mains directed in any vertical, horizontal and oblique direction and of the kind made by embedding conductors in an insulating material for which said conductors act as reinforcement means, comprising, in combination, an elongated symmetrical body of rigid homogeneous insulating material including at each end at least one flared end portion parallel to a longitudinal plane passing through the axis of said body and terminating in successive steps symmetrical with respect to said axis, and a plurality of bare conductors embedded in said body, grouped in parallel between the flared portions and spaced in accordance with the insulating characteristics of said insulating material, said characteristics determining the cross-sectional area of said body, said bare conductors being grouped in different groups, the number of which is equal to the number of flared portions at each end, each group having a fan-like spread in parallel to said longitudinal plane and emerging from said body substantially through the centers of the steps of the corresponding flared portion, the dimensions of said steps being such that the spacing between two adjacent emerging bare conductors corresponds to the required air insulation therebetween and to the spacing required for the electric junctions and connections while the current leakage path between said two successive conductors on the end surface of said body is increased.

2. A prefabricated electric line element, according to claim 1, wherein the cross-section of the body is square and wherein the bare conductors have a square cross-section the sides of which are parallel to the diagonals of the body cross-section.

3. A prefabricated electric line element usable for mains directed in any vertical, horizontal and oblique direction and of the kind made by embedding conductors in a homogeneous insulating material for which said conductors act as reinforcement means, comprising, in combination, an elongated symmetrical body of rigid insulating material including two flared end portions parallel to a longitudinal plane passing through the axis of said body and terminating in successive steps symmetrical with respect to said axis, and a plurality of bare conductors embedded in said body, grouped in parallel between the flared end portions and spaced in accordance with the insulating characteristics of said insulating material, said characteristics determining the cross-sectional area of said body, said bare conductors having at each end a fan-like spread in parallel to said longitudinal plane and emerging from said body substantially through the centers of the steps of the two flared end portions, the dimensions of said steps being such that the spacing between two successive emerging bare conductors corresponds to the required air insulation therebetween and to the spacing required for the electric junctions and connections while the current leakage path between said two successive conductors on the end surface of said body is increased.

4. A prefabricated electric line element usable for mains directed in any vertical, horizontal and oblique direction and of the kind made by embedding conductors in a homogeneous insulating material for which said conductors act as reinforcement means, comprising, in combination, an elongated symmetrical body of rigid insulating material each end of which includes two flared end portions respectively parallel to two longitudinal planes passing through the axis of said body and respectively terminating in successive steps symmetrical with respect to said axis and a plurality of bare conductors embedded in said body, grouped in parallel between said flared end portions and in accordance with the insulating characteristics of said insulating material, said characteristics determining the cross-sectional area of said body, said bare conductors in each end portion of said body being grouped in two groups respectively having fan-like spreads in parallel to said longitudinal planes and emerging from said body substantially through the centers of the steps of the corresponding flared end portions, the dimensions of said steps being such that the spacing between two successive emerging bare conductors corresponds to the required air insulation therebetween and to the spacing required for the electric junctions and connections while the current leakage path between said two successive conductors on the end surface of said body is increased.

5. A prefabricated electric line element, according to claim 4, wherein the two longitudinal planes are crossing planes.

6. A prefabricated electric line element usable for mains directed in any vertical, horizontal and oblique direction and of the kind made by embedding conductors in an insulating material for which said conductors act as reinforcement means, comprising, in combination, an elongated symmetrical body of rigid insulating material including at each end at least one flared end portion parallel to a longitudinal plane passing through the axis of said body and terminating in successive steps symmetrical with respect to said axis, a plurality of bare conductors embedded in said body and grouped in parallel between said flared portions and spaced in accordance with the insulating characteristics of said insulating material, said characteristics determining the cross-sectional area of said body, said bare conductors being in different groups, the number of which is equal to the number of flared portions at each end, each group having fan-like spreads in parallel to said longitudinal plane and emerging from said body substantially through the centers of the steps of the corresponding flared portions, the dimensions of said steps being such that the spacing between two emerging bare conductors corresponds to the required air insulation therebetween and to the spacing required for the electric junctions and connections while the current leakage path between said two successive conductors on the end surface of said body is increased, and said body is formed between said flared ends with at least one widened portion wherein the conductors are spread out and wherein branch terminals are connected to the conductors in each widened portion, said branch terminals projecting from said body.

7. A prefabricated electric line element comprising a member of homogeneous insulating material, said insulating material being rigid, said member having an elongated central portion and flared end portions integrally extending from said elongated central portion, a plurality of steps in said flared end portions, a plurality of substantially rigid main conductors embedded in said member, each of said main conductors being substantially parallel to the axis of said member in said elongated central portion and respectively extending through a step of each of said plurality of steps in said flared end portions, a widened section in said elongated central portion wherein said main conductors are spread out, and branch conductors laterally extending respectively from each of said main conductors through said widened section of said central portion.

8. A prefabricated electric line element comprising a member of homogeneous insulating material, said insulating material being rigid, said member having an elongated central portion and flared end portions integrally extending from said elongated central portion, said flared end portions being disposed in at least one plane that includes the axis of said elongated central portion, a plurality of steps in each of said flared end portions, each of said plurality of steps being symmetrically disposed with respect to the axis of said elongated central portion, and a plurality of substantially rigid continuous conductors disposed in said member, each of said substantially rigid conductors being substantially parallel to said axis in said elongated central portion and respectively extending through one of said steps in each of said flared end portions.

9. A prefabricated electric line element, according to claim 1, wherein the insulating material is an insulating concrete.

10. A prefabricated electric line element, according to claim 1, wherein the body is formed with shoulders adjacent its ends for facilitating the suspension of the element in the vertical position.

11. A prefabricated electric line element, according to claim 1, wherein the steps are inclined with respect to the axis of the body and each conductor emerges at right angles with the surface of the corresponding step.

References Cited in the file of this patent

UNITED STATES PATENTS

| | | |
|---|---|---|
| 235,883 | Kitzmiller | Dec. 28, 1880 |
| 286,950 | Martin | Oct. 16, 1883 |
| 293,214 | Averell | Feb. 12, 1884 |
| 456,611 | Balsley | July 28, 1891 |